(12) United States Patent
Ruy et al.

(10) Patent No.: US 8,081,583 B2
(45) Date of Patent: Dec. 20, 2011

(54) METHOD OF SUPPORTING NODE PORTABILITY IN SENSOR NETWORK

(75) Inventors: Jae Hong Ruy, Daejeon (KR); Jong Suk Chae, Daejeon (KR); Cheol Sig Pyo, Daejeon (KR); Bong Soo Kim, Daejeon (KR); Eun Ju Lee, Daejeon (KR); Myung Jong Lee, Paramus, NJ (US); Tae Rim Park, New York, NY (US); Rui Zhang, New York, NY (US)

(73) Assignees: Electronics & Telecommunications Research Institute, Daejeon (KR); Research Foundation of the City University of New York, New York, NY (US)

( * ) Notice: Subject to any disclaimer, the term of this patent is extended or adjusted under 35 U.S.C. 154(b) by 721 days.

(21) Appl. No.: 12/171,913

(22) Filed: Jul. 11, 2008

(65) Prior Publication Data
US 2009/0147699 A1    Jun. 11, 2009

(30) Foreign Application Priority Data

Dec. 11, 2007 (KR) ................. 10-2007-0128227
Jul. 7, 2008 (KR) ................. 10-2008-0065594

(51) Int. Cl.
*H04L 12/26* (2006.01)

(52) U.S. Cl. ........................................ 370/256
(58) Field of Classification Search .......... 370/254, 370/255, 256
See application file for complete search history.

(56) References Cited

U.S. PATENT DOCUMENTS

| | | | |
|---|---|---|---|
| 6,515,974 B1 * | 2/2003 | Inoue et al. | 370/331 |
| 2009/0006596 A1 * | 1/2009 | Dinakaran et al. | 709/223 |
| 2010/0202335 A1 * | 8/2010 | Borean et al. | 370/311 |

OTHER PUBLICATIONS

IEEE 802.15.5 WPAN Portability Proposal, in IEEE P802.15 Working Group for Wireless Personal Area Networks (WPANs), dated Jul. 2007.

* cited by examiner

*Primary Examiner* — Melvin Marcelo
(74) *Attorney, Agent, or Firm* — Kile Park Goekjian Reed & McManus PLLC (57) ABSTRACT

Provided is a method of supporting node portability in a sensor network, wherein data transmission to a portable node can be guaranteed since even when the portable node is assigned with a different address by being associated with another network, the newly assigned address is transmitted to a parent node or a sink node that was previously associated with the portable node.

13 Claims, 10 Drawing Sheets

METHOD OF SUPPORTING NODE PORTABILITY IN SENSOR NETWORK

The present invention is supported by the Information Technology (IT) Research & Development (R&D) program of the Ministry of Information and Communication (MIC) and the Institute for Information Technology Advancement (IITA) [2005-S-038-03, Development of UHF-RF-ID and Ubiquitous Networking Technologies].

CROSS-REFERENCE TO RELATED PATENT APPLICATION

This application claims the benefit of Korean Patent Application No. 10-2007-0128227, filed on Dec. 11, 2007, and Korean Patent Application No. 10-2008-0065594, filed on Jul. 7, 2008, in the Korean Intellectual Property Office, the disclosures of which are incorporated herein in their entirety by references.

BACKGROUND OF THE INVENTION

1. Field of the Invention

The present invention relates to a method of supporting portability of elements in a sensor network having a mesh structure.

2. Description of the Related Art

So far, it has been considered that element portability and related services in a sensor network are not required. However, as industrialization of sensor network advanced, their requirements were raised. Also, they have been studied in a conventional network, but rarely in a sensor network that requires low power.

SUMMARY OF THE INVENTION

The present invention provides a method of supporting node portability in a sensor network having a mesh structure.

According to an aspect of the present invention, there is provided a method of supporting node portability in a sensor network, wherein a portable node transmits an assigned new address to an old parent node so that data from a source node set as an old address of the portable node is routed to the portable node.

According to another aspect of the present invention, there is provided a method of supporting portable node portability in a sensor network, the method comprising: detecting portability from a old parent node to a new parent node; receiving a new address from the new parent node through an active scanning; and transmitting the new address to the old parent node.

In the method, the detecting of portability may include the operations of detecting portability of the portable node by detecting that a reception confirmation message about transmitted data from the old parent node is not received, or by the old parent node detecting that a reception confirmation message about transmitted data from the portable node is not received.

In the method, the detecting of portability may include the operations of detecting portability of the portable node when it is detected that a Hello message from the old parent node is not received.

In the method, the receiving of a new address may include the operations of selecting the new parent node based on beacons received from candidate parent nodes; and receiving the new address from the selected new parent node in response to an association request.

In the method, the selecting of the new parent node may include the operations of selecting a candidate parent node that transmitted a beacon having the biggest received signal strength indicator (RSSI) value as the new parent node.

The method may further include the operations of receiving data set as an old address of the portable node routed by a neighboring node that received the new address of the portable node from the old parent node and the data from a source node.

In the method, the transmitting may further include the operations of transmitting the new address to a network coordinator.

The method may further include the operations of receiving the data set as a new address of the portable node from a source node, wherein the source node has received a route error message of the data set as an old address from a neighboring node that received the new address of the portable node broadcasted by the old parent node and has received the new address of the portable node in response to a request for the new address of the portable node from the network coordinator.

According to another aspect of the present invention, there is provided a method of supporting portable node portability by a relay node in a sensor network, the method comprising: receiving a new address of the portable node from an old parent node of the portable node; notifying a change of an address of the portable node to a source node after receiving data set as an old address of the portable node from the source node; and routing the received data to the new address of the portable node.

In the method, the notifying the change of an address may include the operations of transmitting the new address of the portable node to the source node.

In the method, the notifying the change of an address may include the operations of transmitting a route error message to the source node so that the source node routes the data to the new address of the portable node received in response to an request for the new address of the portable node from the network coordinator that updated a node address table.

Also, the method may further include the operations of changing an existing portable node status and updating routing information based on the new address of the portable node.

Also, the method may further include the operations of receiving the new address of the portable node from the new parent node in order to update a link status.

The portable node may be the lowest node in the sensor network.

According to another aspect of the present invention, there is provided a computer readable recording medium having recorded thereon a program for executing the methods above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. In the drawings, like reference numerals denote like elements. Also, while describing the present invention, detailed descriptions about related well-known functions or configurations that may diminish the clarity of the points of the present invention are omitted.

When an element is "included", it means that other elements may be further included, instead of excluding other elements unless there is any specific contrary description.

According to a basic principle of the present invention, even when a node (or a device) moves and is assigned with a new address by being associated with another network, the node can receive data from a parent node or a sink node of a previous network via the new address. Accordingly, when a sensor node is moved and assigned with a new address, the sensor node transmits the new address to a previous parent node so that even when a third node transmits data to a previous address of the sensor node, the data can be routed to the new address of the sensor node.

The present invention provides a method of supporting portability of a node that is compatible with an address scheme and a routing scheme of an automatic portability detection and IEEE802.15.5.

In a sensor network having a mesh structure, the lowest node with respect to the topmost sink node is called a leaf node. In the present invention, a method of supporting portability of a leaf node is mainly described. The portability of a leaf node (or a portable device) is useful in many scenarios of a wireless personal area network (WPAN) mesh network. For example, the present invention may be applied to multi-functional remote control having mesh capability, so as to control a TV or other home appliances in different indoor spaces at home.

A sensor network having a mesh structure of the present invention includes a portable node, a parent node with which the portable node associates, a plurality of neighboring nodes as relay nodes associating with the parent node, and a sink node managing the sensor network. Hereinafter, a sink node is also used as a network coordinator or a mesh coordinator.

A method of supporting node portability includes detecting node portability, rejoining a portable node to a network, assigning a new address to the portable node, and notifying relevant nodes about the node portability.

Figure 1A:
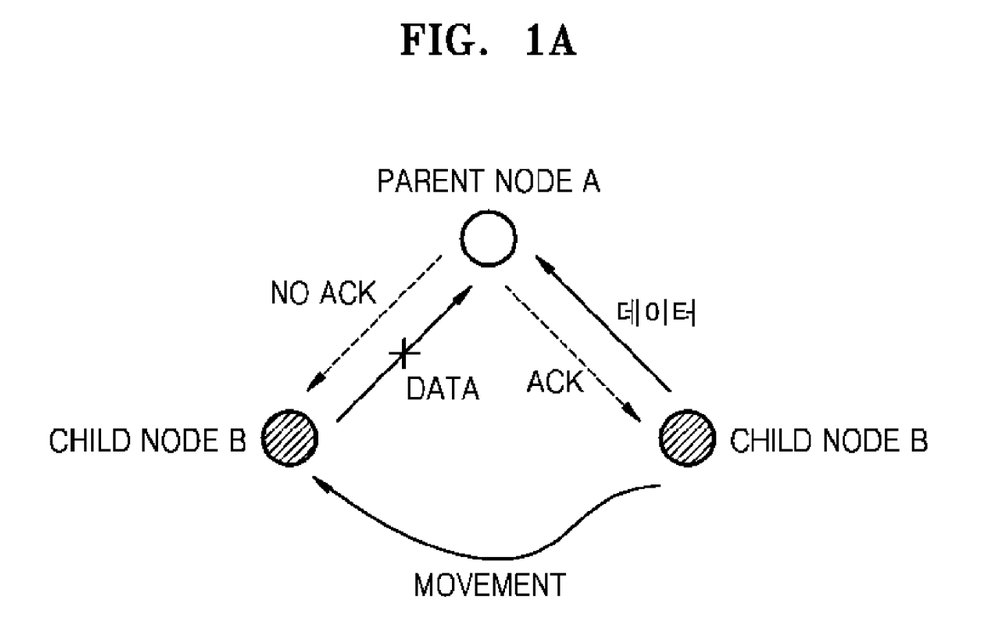
FIGS. 1A and 1B are diagrams for describing a method of detecting node portability, according to an embodiment of the present invention.
Figure 1B:
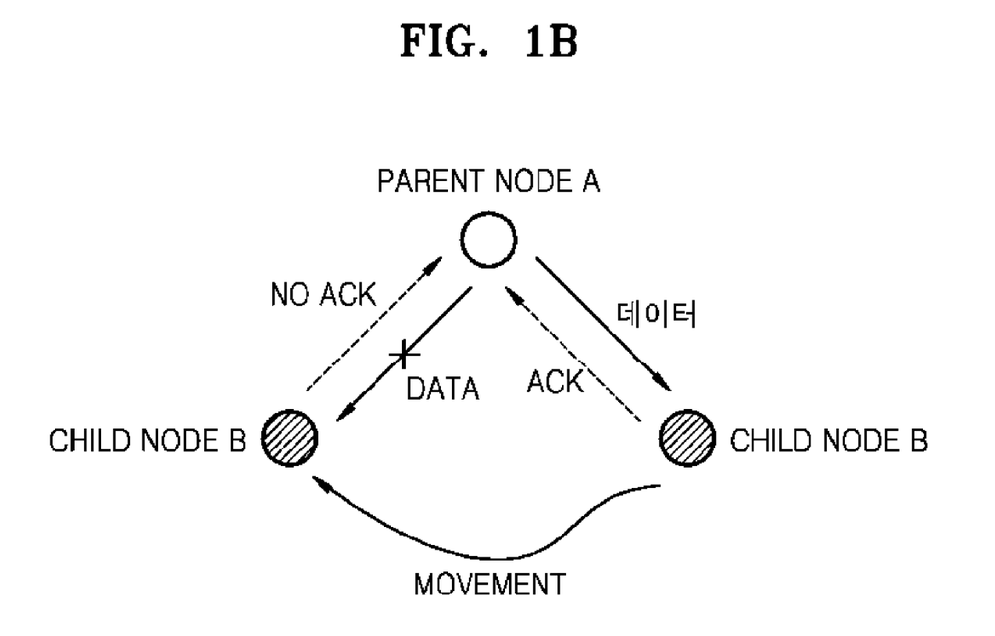

FIGS. 1A and 1B are diagrams for describing a method of detecting node portability, according to an embodiment of the present invention. According to the current embodiment, a portable node or a parent node of the portable node may detect the node portability.

A portable node recognizes its movement when it is moved away from a parent node, and thus cannot transmit any packets to the parent node. Alternatively, in a network wherein a 'hello' message is periodically transmitted, the portable node recognizes its movement when a 'hello' message is not received from the parent node. The parent node detects the movement of a child node, i.e. the portable node, when an ACK message is not received after transmitting a packet to the portable node. Upon detecting the movement, a mesh layer of the portable node itself notifies the movement (MHMSE-LEAVE) to its upper layer of the portable node, and a mesh layer of the parent node notifies the movement (MHMSE-LEAVE) to its upper layer.

Referring to FIG. 1A, a child node B recognizes its movement when an ACK message is not received from a parent node A. Before the movement, the child node B upwardly transmits data to the parent node A, and receives the ACK message from the parent node A. If the ACK message is not received from the parent node A after transmitting the data to the parent node A, the child node B determines that data transmission has failed due to its movement.

Referring to FIG. 1B, a parent node A detects movement of a child node B, when an ACK message is not received from the child node B. Before the movement, the parent node A downwardly transmits data to the child node B, and receives the ACK message from the child node B. If the parent node A does not receive the ACK message from the child node B after transmitting the data to the child node B, the parent node A determines that data transmission failed due to the movement of the child node B.

Figure 2A:
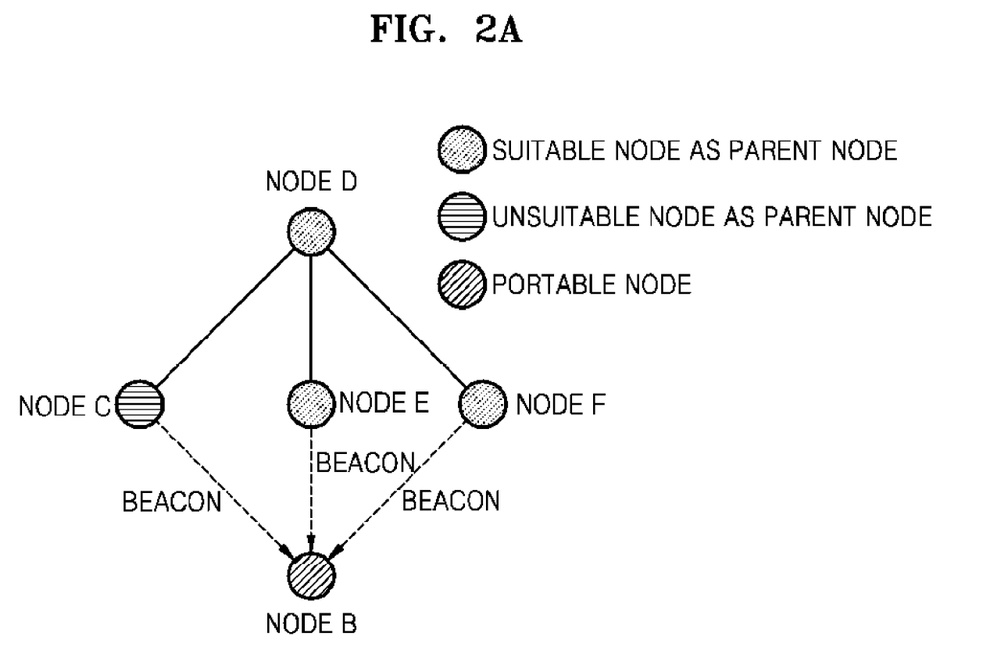
FIGS. 2A and 2B are diagrams for describing a mesh rejoining procedure of a portable node, according to an embodiment of the present invention.
Figure 2B:
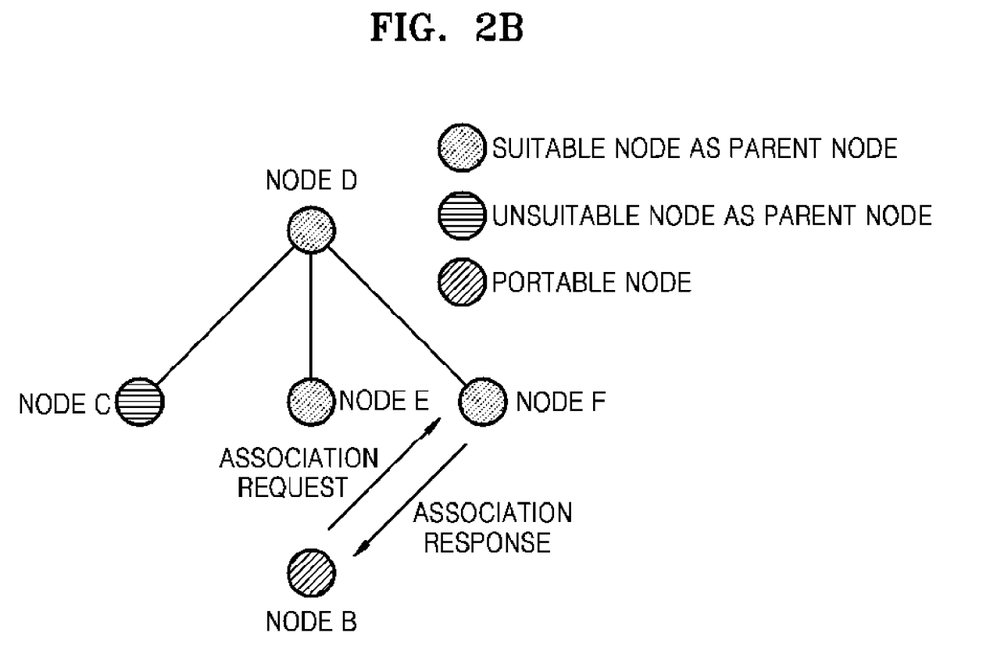

FIGS. 2A and 2B are diagrams for describing a mesh rejoining procedure of a portable node, according to an embodiment of the present invention.

A portable node that initiated the mesh rejoining procedure is connected to a new parent node via an active scanning operation. The portable node rejoins a network by transmitting a mesh join request message (MHMSE-JOIN.request) to a mesh layer after the portable node moves to a new location. Here, the portable node may transmit the mesh join request message to the mesh layer with a parameter RejoinNetwork set to mode 0x02.

The mesh join request message generates an active scan in a MAC layer. A candidate parent node (or a potential parent node), which receives the active scan, responds with a beacon frame. The potential parent node may insert its capability, which is determined by its upper layer, to the beacon frame so as to indicate whether it can accept the portable node as a new child node.

Upon receiving beacon frames from potential parent nodes, the portable node selects a suitable parent node to join. A policy for the portable node to join to the suitable parent node is determined by its upper layer. After the portable node selects the suitable parent node, the portable node generates an association request message (MLME-ASSOCIATE.request) in the MAC layer so as to perform an association procedure.

Upon receiving the association request message, the parent node first checks a mesh address mapping table so as to determine whether the portable node was a child node in the past. If the portable node was a child node in the past, the parent node assigns the portable node with the same address as before. If the portable node was not the child node, the parent node assigns the portable node with a new address (new short address) selected from an available address block of the parent node. The new address is assigned by using an association response message (MLME-ASSOCIATE.response) with respect to the association request message.

After transmitting the association response message to the portable node, the parent node notifies its upper layer about the join (or rejoin) of the portable node (MHSME-JOIN.Indication). Upon receiving the association response, the portable node notifies the result of the join to its upper layer (MHSME-JOIN.Confirm).

Referring to FIG. 2A, a portable node B receives beacons from neighboring potential parent nodes C, D, E, and F. A payload of a beacon includes additional information about a node status indicating whether a potential parent node can accept a new child node, and thus the portable node B can select a suitable parent node.

The portable node B receives the beacons from the potential parent nodes C, D, E, and F, and determines that the potential parent node C is not suitable as a parent node via the additional information in the payload of the beacon of the potential parent node C. Then, the portable node B selects a node that satisfies predetermined conditions as a parent node, from among the potential parent nodes D, E, and F. The predetermined conditions may be established by various parameters so that a node having the optimum functions can be selected as a parent node. For example, the predetermined conditions may be established in such a way that a received signal strength indicator (RSSI) value of a node may be measured, and a node having the largest RSSI value is selected as a parent node. A potential parent node may include an old parent node of the portable node B.

After selecting a new parent node F, for example, the portable node B initiates a MAC association procedure. In other words, the portable node B transmits a MAC association request message to the new parent node F.

Referring to FIG. 2B, upon receiving the MAC association request message from the portable node B, the new parent node F determines whether it has information about the portable node B that requested the MAC association request. If the new parent node F has the information, the parent node F assigns the portable node B with a previous address, and if the new parent node F does not have the information, the parent node F assigns the portable node B with a new address. The mesh rejoining procedure of the portable node B and the parent node F is completed when the parent node F transmits an association response message, which includes information about the new address of the portable node B, to the portable node B.

If the mesh rejoining procedure fails, the portable node B reselects the second most suitable node as a parent node, and performs procedures of the MAC association request and association response reception. The mesh rejoining procedure is repeated for all potential parent nodes until the mesh rejoining procedure succeeds, and may be limited to a predetermined number of times according to settings.

Figure 3:
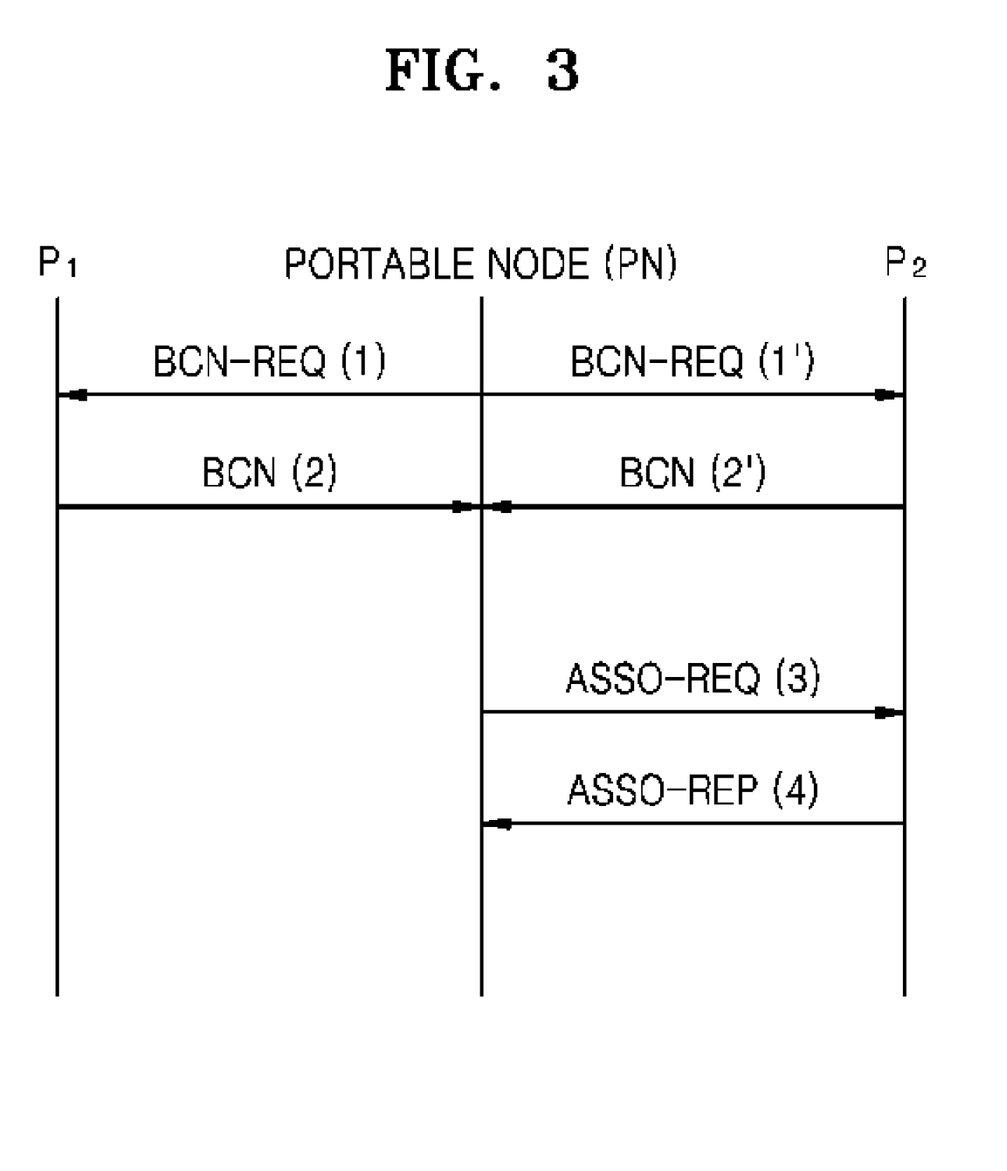
FIG. 3 is a message flowchart briefly illustrating a mesh rejoining procedure through an active scanning, according to an embodiment of the present invention.

FIG. 3 is a message flowchart briefly illustrating a mesh rejoining procedure through an active scanning, according to an embodiment of the present invention.

A portable node PN transmits a beacon request message (BCN-REQ) to each potential parent node P1 and P2 in operation 1 and 1'.

The potential parent nodes P1 and P2 each transmit a beacon BCN including status information to the portable node PN in operation 2 and 2'.

Based on the status information extracted from the beacon BCN, the portable node PN selects a parent node having optimum functions, i.e., selects the potential parent node P2 as a parent node, and transmits an association request message (ASSO-REQ) to the selected parent node P2 in operation 3.

The parent node P2 transmits an association response message (ASSO-RESP) including information about a new address of the portable node PN to the portable node PN in operation 4.

Upon receiving an association acknowledgement and the new address of the portable node PN from the parent node P2, the portable node PN completes the mesh rejoining procedure.

Figure 4A:
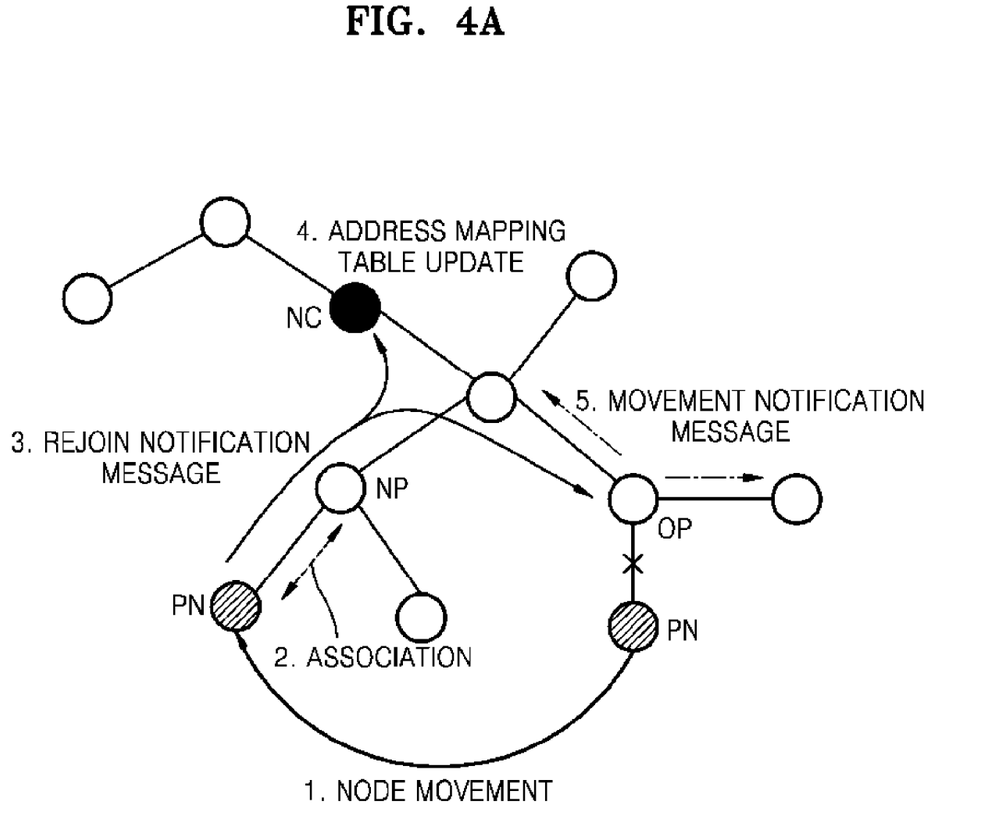
FIG. 4A is a diagram for describing a method of transmitting movement information of a portable node that is mesh rejoined in a centralized network.
Figure 4B:
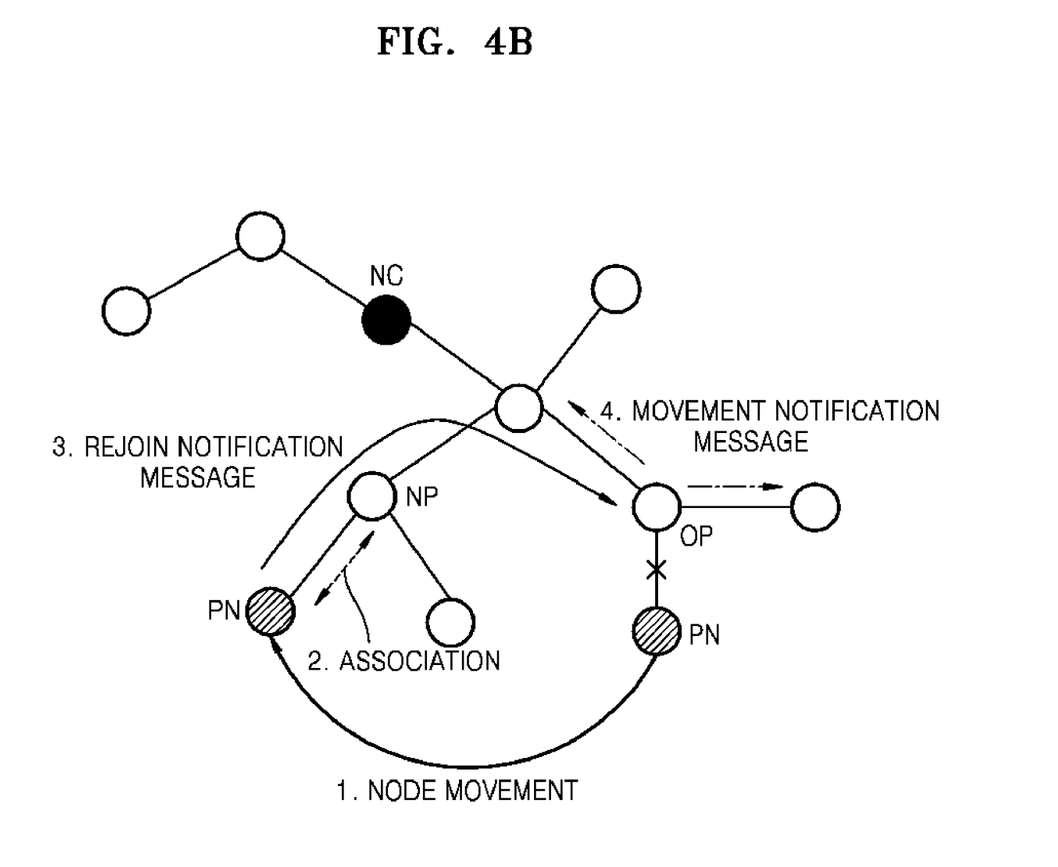
FIG. 4B is a diagram for describing a method of transmitting movement information of a portable node that is mesh rejoined in a distributed network.

FIG. 4A is a diagram for describing a method of transmitting movement information of a portable node PN that is mesh rejoined in a centralized network, and FIG. 4B is a diagram for describing a method of transmitting movement information of a portable node PN that is mesh rejoined in a distributed network.

Referring to FIG. 4A, the portable node PN notifies movement information of the portable node PN to both an old parent node OP and a network coordinator NC in the centralized network.

The portable node PN moves away from the old parent node OP, and performs a mesh rejoining operation via an association exchange with a new parent node NP. After successively connecting to a network via an association procedure with the new parent node NP, the portable node PN unicasts a rejoin notification message (Rejoin_Notify) to the network coordinator NC and the old parent node OP. A command frame subtype of the rejoin notification message may be expressed in a predetermined bit value, such as 11110. A destination address field is established by using addresses of the network coordinator NC and the old parent node OP. The rejoin notification message includes an IEEE address, the new address, and an old address of the portable node PN, Upon receiving the rejoin notification message, the network coordinator NC updates an address mapping table. The address mapping table, which is managed by the network coordinator NC, maps and stores an IEEE address and an address (short address) of each node.

Meanwhile, upon receiving the rejoin notification message, the old parent node OP broadcasts the rejoin notification message or a movement notification message (Move_Notify) including the new address and the old address of the portable node PN to neighboring nodes.

Upon receiving the movement notification message, the neighboring nodes changes an entry status of the portable node PN to "removed" or "moved" in a neighboring node list, and updates a connectivity matrix. The connectivity matrix forms association relationships of neighboring nodes included in the neighboring node list based on one hop neighboring node information included in a 'hello' message received by each node. The connectivity matrix may be used to calculate a hop number of each node in the neighboring node list.

Referring to FIG. 4B, the portable node PN notifies movement information of the portable node PN only to an old parent node OP in the distributed network.

The portable node PN moves away from the old parent node OP, and performs a mesh rejoining operation with a new parent node NP via an association exchange. After successively connecting to a network via an association procedure with the new parent node NP, the portable node PN notifies its new address to relevant nodes. The relevant nodes include the old parent node OP of the portable node PN, and nodes including the portable node PN in a neighboring node list.

The portable node PN first unicasts a rejoin notification message (Rejoin_Notify) to the old parent node OP. A command frame subtype of the rejoin notification message may be expressed in a predetermined bit value, such as 11110. A destination address DA field is established with an address of the old parent node OP. Upon receiving the rejoin notification message, the old parent node OP broadcasts the rejoin notification message or movement notification message (Move_Notify) to neighboring nodes having a [hop number of an allowable 'hello' message transmission+1], i.e. (TTLOfHello+1) hops. Here, it is assumed that each node includes '(TTLOfHello+1)-hop neighbor table'. Therefore, the old parent node OP needs to broadcast to (TTLOfHello+1) hop neighbors.

Upon receiving the rejoin notification message, each node that includes the portable node PN in its neighboring node table changes a status of the portable node PN to "removed" or "moved", and updates a connectivity matrix.

Figure 5A:
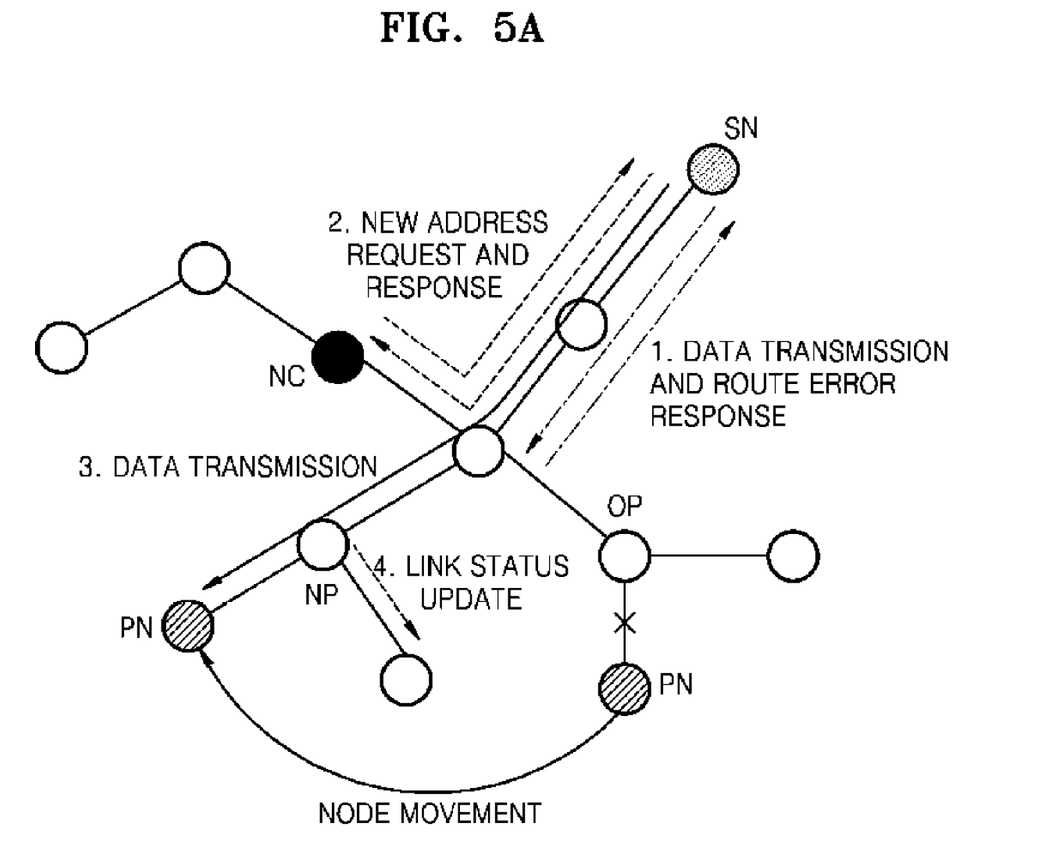
FIG. 5A is a diagram for describing a method of routing data to a portable node that is mesh rejoined in a centralized network.
Figure 5B:
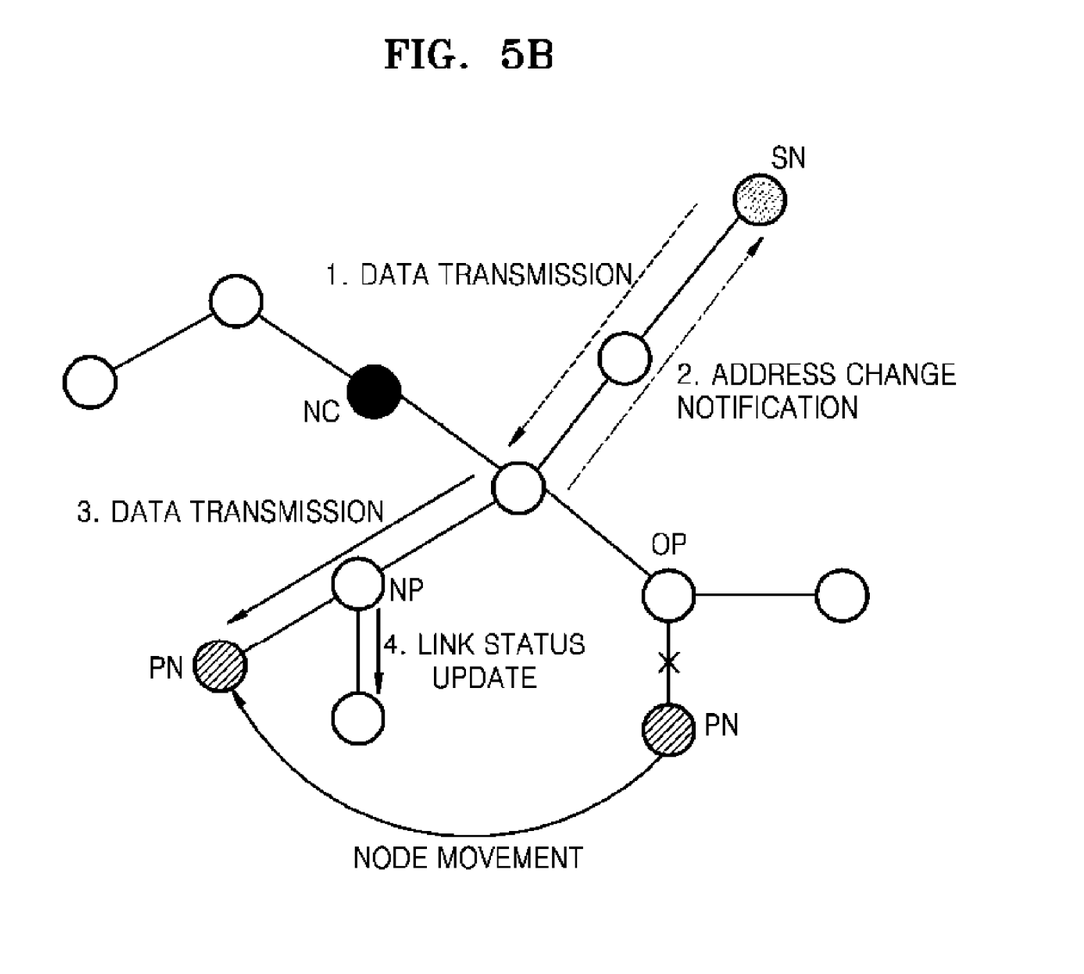
FIG. 5B is a diagram for describing a method of routing data to a portable node that is mesh rejoined in a distributed network.

FIG. 5A is a diagram for describing a method of routing data to a portable node PN that is mesh rejoined in a centralized network, and FIG. 5B is a diagram for describing a method of routing data to a portable node PN that is mesh rejoined in a distributed network.

Referring to FIG. 5A, when a source node SN transmits data to the portable node PN in an old address of the portable node PN, the data is routed by using a network coordinator NC.

A node that received the data (packet) having the old address of the portable node PN as a destination address notifies a route error to the source node SN. The node is a node that includes movement information of the portable node PN by receiving a movement notification message broadcasted from an old parent node OP, and that relays the data.

Upon receiving the route error, the source node SN requests the network coordinator NC for a new address of the portable node PN. Then, the network coordinator NC transmits the new address to the source node SN. Accordingly, the source node SN can transmit the data to the portable node PN based on the received new address.

Referring to FIG. 5B, when a source node SN transmits data to an old address of the portable node PN in the distributed network, the data is routed without using a network coordinator NC.

A node that received the data (packet) having the old address of the portable node PN as a destination address transmits a new address of the portable node PN to the source node SN, and re-routes the data to the new address of the portable node PN. The node is a node that includes the new address of the portable node PN in a "removed (or moved)" status in its neighboring node list by receiving a movement notification message broadcasted from an old parent node OP, and that relays the data. The new address of the portable node PN may be transmitted to the source node SN by using a rejoin notification message or the movement notification message.

Meanwhile, referring to FIGS. 5A and 5B, when the rejoin of the portable node PN is completed, the new parent node NP updates a link status table, and broadcasts a 'hello' message so as to notify neighboring nodes about the link status change. Here, the neighboring node may have a [hop number of allowable 'hello' message transmissions+1], i.e. (TTLOfHello+1) hops.

Figure 6:
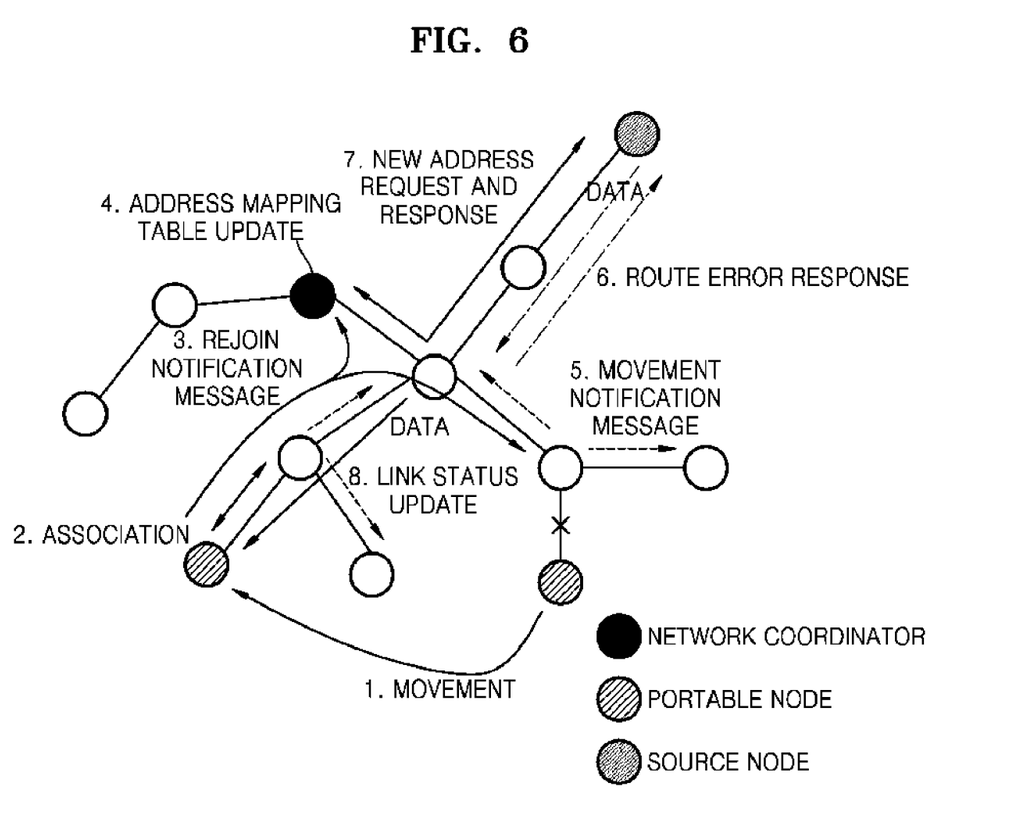
FIG. 6 is a diagram for generally describing processes of routing data to a portable node in a centralized network, according to an embodiment of the present invention.
Figure 7:
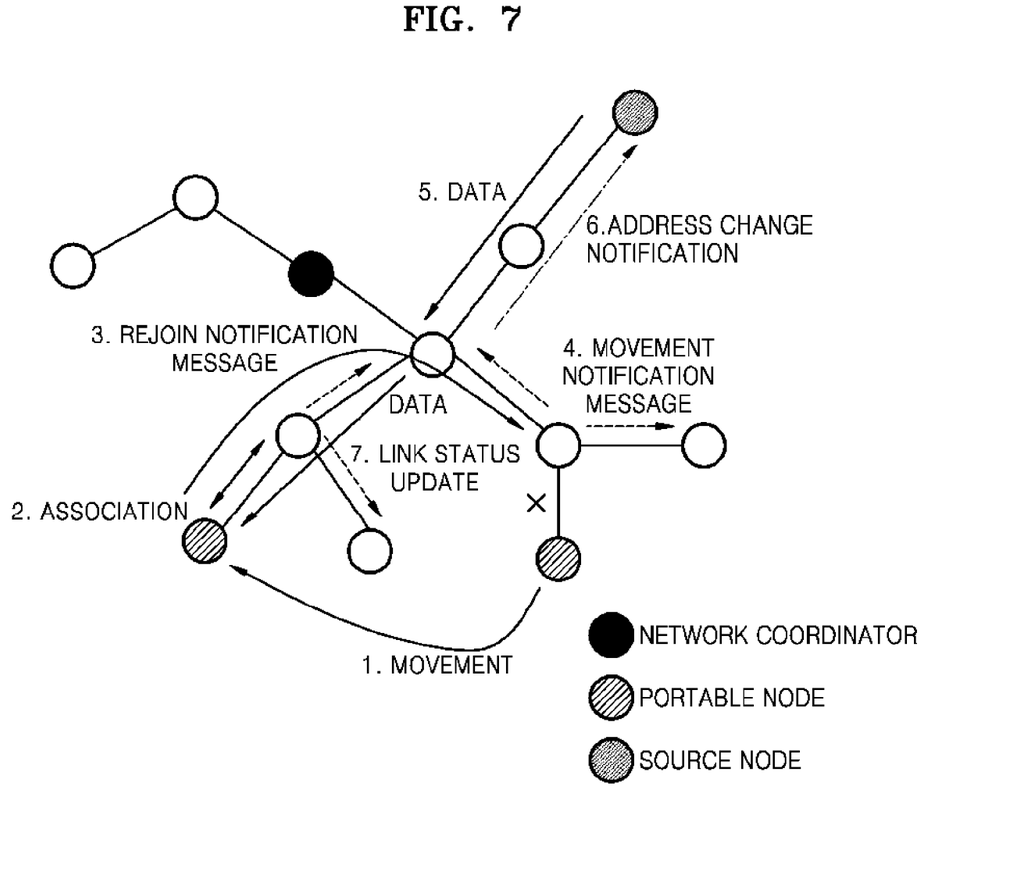
FIG. 7 is a diagram for generally describing processes of routing data to a portable node in a distributed network, according to an embodiment of the present invention.

FIG. 6 is a diagram for generally describing processes of routing data to a portable node in a centralized network, according to an embodiment of the present invention, and FIG. 7 is a diagram for generally describing processes of routing data to a portable node in a distributed network, according to an embodiment of the present invention. Since each process has already been described with reference to FIGS. 1A through 5B, details thereof are omitted.

Figure 8:
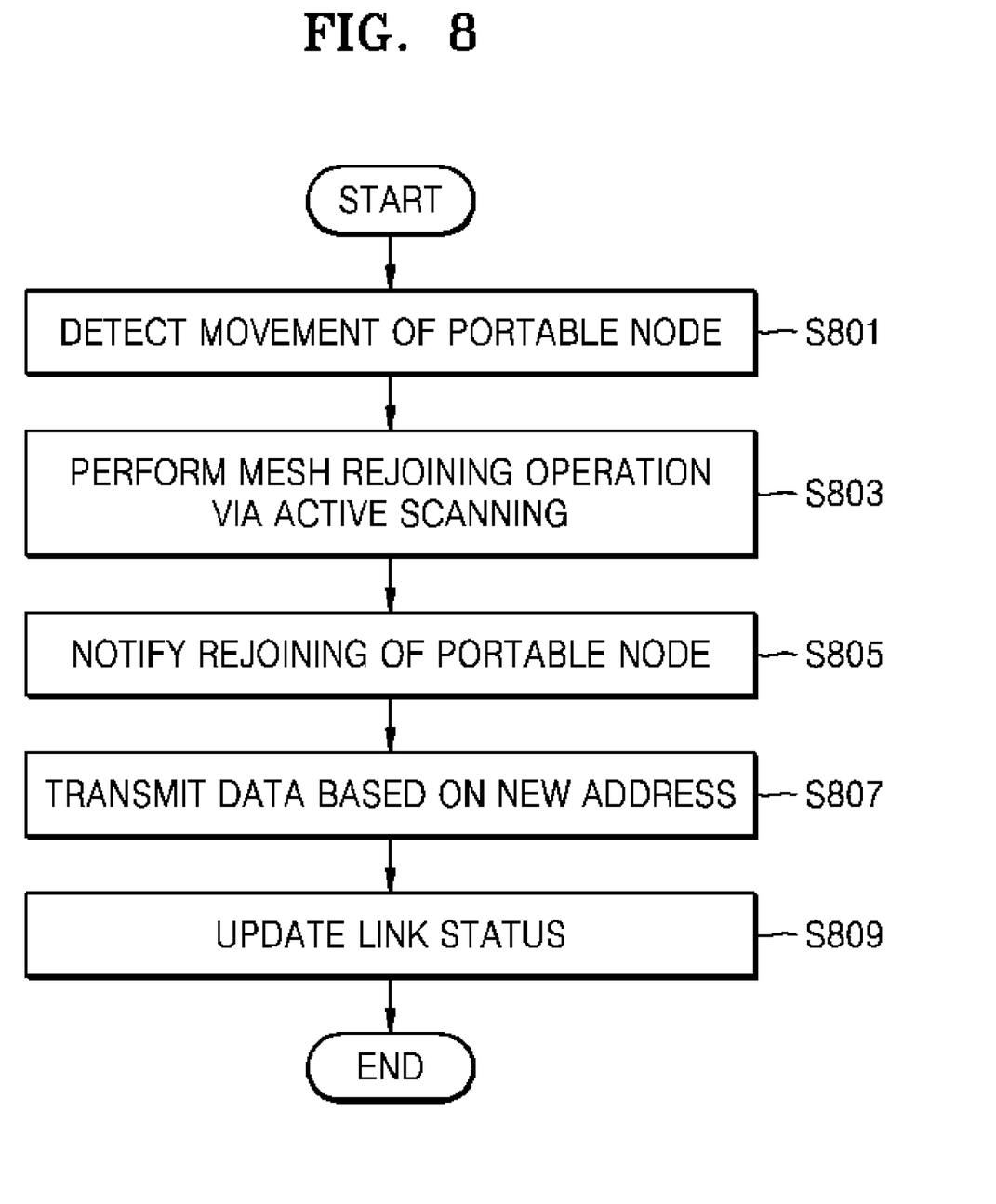
FIG. 8 is a flowchart illustrating a method of supporting node portability for transmitting data to a portable node, according to an embodiment of the present invention.

FIG. 8 is a flowchart illustrating a method of supporting node portability for transmitting data to a portable node, according to an embodiment of the present invention. The descriptions of the method that are the same as those described above are omitted.

Referring to FIG. 8, movement of the portable node is detected by the portable node itself or an old parent node, in operation S801.

The portable node that is in a new moved location performs a mesh rejoining operation via active scanning, in operation S803. The portable node receives beacons from potential parent nodes in response to the mesh rejoining request, and selects the optimum new parent node based on information included in the received beacons. The portable node transmits an association request to the selected new parent node, and the new parent node responds to the portable node by assigning a new address to the portable node.

After the mesh rejoining operation is completed, the portable node notifies relevant nodes about the movement and rejoining, in operation S805. The portable node may notify the movement and rejoining to both a mesh coordinator and the old parent node or only to the old parent node. In case of a centralized network where the movement and rejoining is notified to both the mesh coordinator and the old parent node, the mesh coordinator updates an address mapping table, and the old parent node notifies the movement and the rejoining to neighboring nodes. In case of a distributed network where the movement and rejoining is notified only to the old parent node, the old parent node notifies the movement and rejoining to neighboring nodes. The movement and rejoining notification includes information about the old and new addresses of the portable node.

A source node transmits data to the portable node based on the new address of the portable node, in operation S807. In the case of the centralized network, when the source node transmits the data to the old address of the portable node, a relay node that includes movement information of the portable node notifies a route error to the source node. Upon receiving the route error, the source node obtains the new address of the portable node from the mesh coordinator, and routes the data to the portable node. In the case of the distributed network, when the source node transmits the data to the old address of the portable node, the relay node notifies the change of address of the portable node to the source node, and the portable node routes data to the new address of the portable node.

The new parent node updates its link status, and reports such update to the neighboring nodes, in operation S809. Upon receiving the link status of the new parent node, the neighboring nodes update their link status as well.

The method of supporting node portability according to the current embodiment can be applied to node portability in different networks or in the same network.

According to the present invention, data transmission to a portable node can be supported even when the portable node is assigned with a new address by being associated with another node, by transmitting the new address to an old parent node or a sink node.

Accordingly, even when the portable node is assigned with the new address, the new address is transmitted to the old parent node, and thus data transmitted by a third node to an old address of the portable node can be routed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

The present invention has been described in greater detail with reference to the exemplary embodiments. The terms used to describe the present invention are for descriptive purposes only and are not intended to limit the scope of the invention.

While this invention has been particularly shown and described with reference to preferred embodiments thereof, it will be understood by one skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of supporting portable node portability in a sensor network, the method comprising:
   detecting portability from an old parent node to a new parent node;
   receiving a new address from the new parent node through an active scanning; and
   transmitting the new address to the old parent node,
   wherein the detecting of portability comprises detecting portability of the portable node by detecting that a reception confirmation message about transmitted data from the old parent node is not received, or by the old parent node detecting that a reception confirmation message about transmitted data from the portable node is not received.

2. The method of claim 1, wherein the detecting of portability comprises detecting portability of the portable node when it is detected that a Hello message from the old parent node is not received.

3. The method of claim 1, wherein the receiving of a new address comprises:
   selecting the new parent node based on beacons received from candidate parent nodes; and
   receiving the new address from the selected new parent node in response to an association request.

4. The method of claim 3, wherein the selecting of the new parent node comprises selecting a candidate parent node that transmitted a beacon having the biggest received signal strength indicator (RSSI) value as the new parent node.

5. The method of claim 1, further comprising receiving data set as an old address of the portable node routed by a neighboring node that received the new address of the portable node from the old parent node and the data from a source node.

6. The method of claim 1, wherein the transmitting further comprises transmitting the new address to a network coordinator.

7. The method of claim 6, further comprising receiving the data set as a new address of the portable node from a source node, the source node receiving a route error message of the data set as an old address from a neighboring node that received the new address of the portable node broadcasted by the old parent node and receiving the new address of the portable node in response to a request for the new address of the portable node from the network coordinator.

8. A method of supporting portable node portability by a relay node in a sensor network, the method comprising:
   receiving a new address of the portable node from an old parent node of the portable node;
   notifying a change of an address of the portable node to a source node after receiving data set as an old address of the portable node from the source node; and
   routing the received data to the new address of the portable node.

9. The method of claim 8, wherein the notifying the change of an address comprises transmitting the new address of the portable node to the source node.

10. The method of claim 8, wherein the notifying the change of an address comprises transmitting a route error message to the source node so that the source node routes the data to the new address of the portable node received in response to an request for the new address of the portable node from the network coordinator that updated a node address table.

11. The method of claim 8, further comprising: changing an existing portable node status and updating routing information based on the new address of the portable node.

12. The method of claim 8, further comprising: receiving the new address of the portable node from the new parent node in order to update a link status.

13. The method of claim 8, wherein the portable node is the lowest node in the sensor network.

* * * * *